(12) United States Patent
Griessnig

(10) Patent No.: US 8,125,313 B2
(45) Date of Patent: Feb. 28, 2012

(54) METHOD FOR MANAGING MOBILE OPERATING DEVICES

(75) Inventor: Gerhard Griessnig, Graz (AT)

(73) Assignee: Siemens Aktiengesellschaft, Munich (DE)

( * ) Notice: Subject to any disclaimer, the term of this patent is extended or adjusted under 35 U.S.C. 154(b) by 847 days.

(21) Appl. No.: 12/220,475

(22) Filed: Jul. 24, 2008

(65) Prior Publication Data

US 2009/0033457 A1      Feb. 5, 2009

(30) Foreign Application Priority Data

Aug. 2, 2007    (EP) .................................. 07015224

(51) Int. Cl.
*G05B 19/00*    (2006.01)

(52) U.S. Cl. .... 340/5.5; 340/5.2; 340/10.4; 340/539.11; 340/679; 710/15; 710/73

(58) Field of Classification Search .................. 340/5.5, 340/5.2, 10.41, 10.4, 1.1, 10.1, 10.2, 572.1, 340/6.1, 6.11, 10, 572.3, 539.1, 539.11, 539.23, 539.24, 540, 679; 701/23, 208, 253, 300, 207; 318/16, 472.02, 568.1, 587; 710/15, 73; 709/21–238, 250; 455/426.2–433

See application file for complete search history.

(56) References Cited

U.S. PATENT DOCUMENTS

| | | | |
|---|---|---|---|
| 6,049,745 A * | 4/2000 | Douglas et al. ................. | 701/23 |
| 6,717,382 B2 * | 4/2004 | Graiger et al. ................. | 318/587 |
| 2003/0061295 A1 * | 3/2003 | Oberg et al. ................. | 709/208 |
| 2007/0297890 A1 * | 12/2007 | Sjoberg et al. ................. | 414/735 |

FOREIGN PATENT DOCUMENTS

| | | |
|---|---|---|
| DE | 10129189 A1 | 1/2003 |
| EP | 1479964 A2 | 11/2004 |
| EP | 1672445 A1 | 6/2006 |

* cited by examiner

*Primary Examiner* — George Bugg
*Assistant Examiner* — Sisay Yacob

(57) ABSTRACT

There is described a method for managing mobile operating devices, which are used to operate a machine within an assigned active area. Emergency stop outlets are triggered as a function of status information of an operating device and of the logon in an active area.

17 Claims, 2 Drawing Sheets

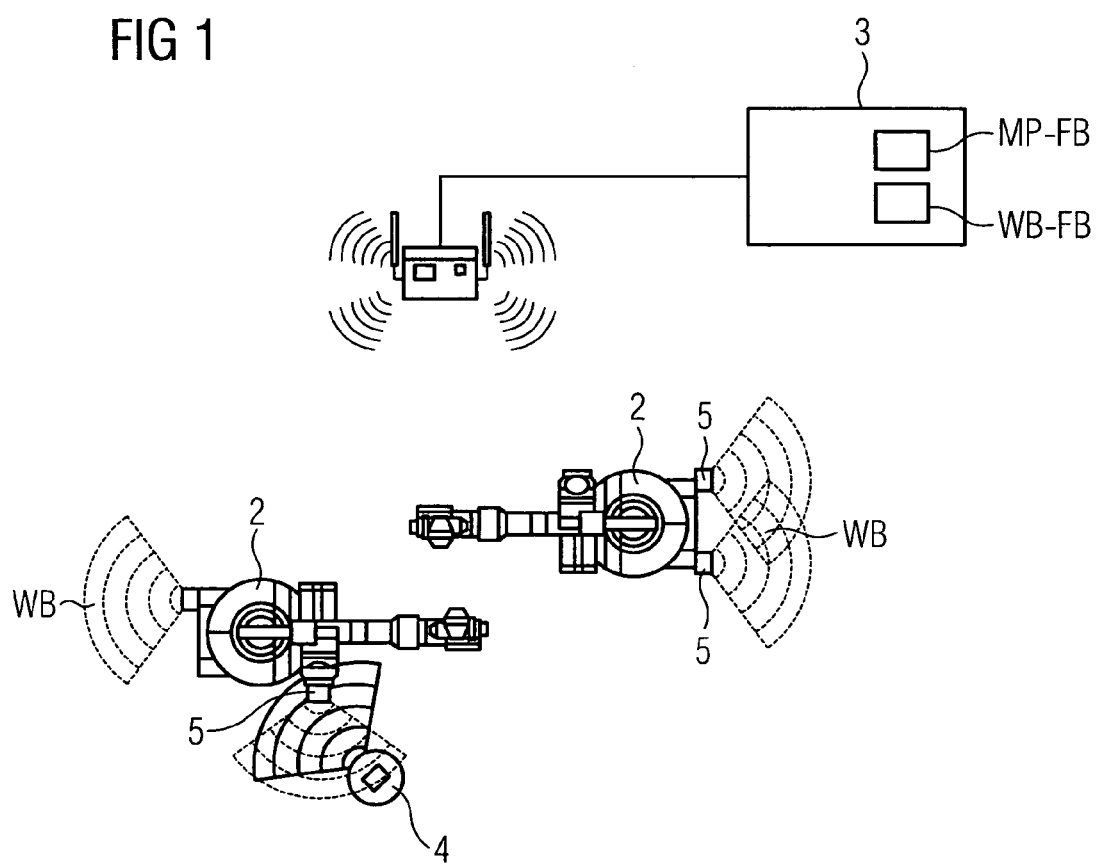

FIG 2

| | | | Emergency stop | Communication error | Timeout |
|---|---|---|---|---|---|
| MP segregated | | | — | — | — |
| MP incorporated | WB logged on | TAG(s) visible and distance OK | Global emergency stop | — | — |
| | | TAG(s) not visible or distance too far Timer expired? | Global emergency stop | Shutdown F-CPU | — |
| | | TAG(s) not visible or distance too far Timer expired? | Global emergency stop | Shutdown F-CPU | Local RAMP-DOWN |
| | WB logged off | | Global emergency stop | Global RAMP-DOWN | — |

METHOD FOR MANAGING MOBILE OPERATING DEVICES

CROSS REFERENCE TO RELATED APPLICATIONS

This application claims priority of European Patent Office application No. 07015224.4 EP filed Aug. 2, 2007, which is incorporated by reference herein in its entirety.

FIELD OF INVENTION

The invention relates to a method for managing mobile operating devices, which are used to operate at least one machine within an assigned active area, with the active area being restricted by one or several RFID transponders (Radial Frequency Identification).

BACKGROUND OF INVENTION

It is not permitted to perform dangerous actions on machines/plants within the safety-relevant field from any site. The operation of these plants was previously only possible at stationary points or with wired devices. These limiting factors are however eliminated by wireless transmission technology. To satisfy the requirements in terms of safety technologies, areas must be technically defined and a clear assignment to these areas must take place. The definition of corresponding active areas, within which the operation of a machine is carried out wirelessly by means of an operating device, is already known. In this way, the active areas are restricted by one or several RFID transponders. High demands in terms of safety are placed on the use of such operating devices in conjunction with the function of the active areas.

Wireless transmission technologies allow the respective user e.g. to leave the corresponding WLAN network with the activated operating device and/or to move freely herein. Leaving the WLAN network, but also temporary communication interruptions which may occur as a result of EMC or other interferences, may cause communication errors to occur, which lead to an emergency stop function being set. This "unwanted" setting of the emergency stop function in plants sometimes leads to expensive dwell times of machines or also to materials being destroyed during the manufacturing processes. The users of such plants are thus particularly interested in ensuring the highest possible availability when operating their machines using the mobile operating devices, even in fault statuses.

SUMMARY OF INVENTION

An object underlying the invention is thus to improve a method for managing mobile operating devices of the type mentioned above to the effect that a high availability of the machines installed in the plant is also achieved in the event of communication errors.

The object is achieved by a method with the features according to an independent claim. Here the afore-cited method is characterized in that status information is held in a controller for each operating device and emergency stop outlets are connected as a function of the status information of the respective operating device and the logon in the active area.

Advantageous developments of the invention emerge from subclaims.

BRIEF DESCRIPTION OF THE DRAWINGS

An exemplary embodiment of the invention is described in more detail below with reference to a drawing, in which:

FIG. 1 shows a system with a mobile, wirelessly communicating operating device for operating machines in a safety-relevant field and FIG. 2 shows a table with the fault diagnosis in the case of different statuses.

DETAILED DESCRIPTION OF INVENTION

FIG. 1 shows a system for operating machines 2 or plants. The system 1 has a controller 3 and a mobile operating device 4, which has means for wireless communication, here specially an RFID radio link (Radial Frequency Identification), with the controller 3.

The operation of the machines 2 is only permitted after logging on in specific active areas WB, which are available via special RFID transponders 5. Dangerous actions, e.g. running machines, can only be performed after logging on in these active areas WB. To satisfy the requirements in terms of safety technology, areas have to be technically defined and a clear assignment to these areas must take place. Accordingly, the active areas WB are defined for the system 1, said active areas WB being available via one or several RFID transponders 5. Here the spatial definition of the active areas WB is determined by the antenna characteristics of the RFID transponders 5 as well as by the projectable maximum distance of the mobile operating device 4 from the relevant RFID transponder 5.

The operating device 4 is connected to the controller 3 by way of a wireless communication link, e.g. a WLAN link, in order in this way to distribute control commands to the controller 3 for operating a machine 2. To this end, the fact that the operating device is incorporated into the controller 3 which is regarded as fail-safe means that the wireless communication link is set up and a payload data transmission can take place between the controller and the operating device 4.

If a user starts up the operating device 4, he/she must ensure that the operating device 4 operates correctly and is incorporated into the fail-safe controller 3. The user is shown this in two ways. A successful incorporation is shown on the display of the operating device 4, with this being an unsafe message, since it is not checked by safety measures. Such a check using corresponding safety measures is implemented with the aid of a safety module in the operating device and the successful incorporation is then indicated as a safe message by way of a light-emitting diode for instance. Only when both events have occurred is the user permitted to operate the operating device 4.

Segregation is understood to mean the intentional segregation of the operating device 4 from the controller 3, without triggering side effects, like for instance a deactivation of the machine 2 in accordance with the specifications of the user.

To ensure that the user operates the correct machine 2, he/she must adjourn to the site of the machine 2 with the operating device 4. This is monitored using one or several RFID transponders 5, which cover the active area WB assigned to the machine, since the user with the operating device 4 has to be located in this active area WB. Only after the user has logged on in the active area WB will the controller 3 implement a control command transmitted thereto on the relevant machine 2. The logon takes place after receiving valid transponder data, i.e. relating to the identification number and the distance of the respective RFID transponder 5 from the operating device 4. This data determined by the operating device 4 after receiving the radio signals of the respective RFID transponder 5 is checked inter alia with the aid of a safety module in the operating device 4. In the event that the transponder data is valid, a logon takes place in the controller 3 in the relevant active area WB and only then can control commands for machines 2 assigned to this active area WB be triggered. A logoff from an active area WB takes place when the operating device 4 no longer receives valid transponder data from the associated RFID transponder 5.

In order to operate and control machines 2 in the safety-relevant field, it is necessary to prevent damage by means of the machine in the event of faults of unsafe statuses. The availability of the machines is however to be kept here as high as possible, i.e. in the event of a fault, not all machines are to be deactivated by means of an emergency shutdown. Attempts are instead made to more or less rapidly deactivate or shut-down the relevant machine in a controlled manner, depending on the type of fault.

In accordance with the invention, status information associated with the different statuses is collected to this end in the controller 3 and a corresponding response is given as a function hereof in the presence of a fault. The corresponding assignment of the already above-described status information like incorporation and segregation of an operating device, logon and logoff in an active area WB in respect of the different fault instances and safety measures provided herefor are reproduced in the table according to FIG. 2.

Provision is made in the controller 3 for an operating device function module MP-FB for each operating device in the plant and an associated active area function module WB-FB for each active area. The operating device function module MP-FB records whether the relevant operating device 4 is incorporated or segregated. The status of the logon or logoff of the relevant operating device 4 in this active area WB is indicated in the active area function module WB-FB.

In accordance with FIG. 2, a global emergency stop is provided irrespective of the logon of the operating device 4 in an active area WB during incorporation into the fail-safe controller 3. An immediate deactivation takes place on all machines of a fail-safe controller which are assigned to the global emergency stop. When leaving the wireless communication link, for instance the WLAN link, but also with temporary communication interruptions, i.e. in the event of a communication error, instead of a global emergency stop, a response is made depending on whether an active area logon or an active area logoff exists. If the communication error between the operating device and the controller 3 occurs during a logon in an active area WB, only the machine in the logged-on active area WB is deactivated immediately, this being referred to here as "shutdown". A deactivation of the machines assigned to the several active areas for instance, which is referred to as global "ramp-down" takes place in accordance with user specifications, in the event of a communication error with a non-logged-on, i.e. logged-off active area WB of an operating device 4. Finally, a timer is started when impermissibly leaving an active area WB, which results in invalid transponder data, because the relevant RFID transponder 5 is no longer visible or is distanced too far therefrom. When the timer expires, which is referred to as "timeout" in FIG. 2, the machine 2 assigned to the active area WB is deactivated in accordance with the specifications of the user, which is referred to here as local "ramp-down".

As a result of the deactivation of machines which is phased according to fault statuses, in part using user specifications, as high an availability as possible is achieved during operation when operating the machines by means of the wirelessly communicating, mobile operating devices.

The invention claimed is:

1. A method for managing a mobile operating device for operating each of a plurality of machines that are controlled by a controller, the method comprising:

establishing a wireless communication link between the operating device and the controller;
providing an RFID transponder on each machine, wherein the RFID transponder establishes an active area for the respective machine;
providing a restricted logon for the operating device within each active area via recognition of one of the RFID transponders by the operating device;
wherein the controller implements the following alternative steps in case of an error on the wireless communication link:
providing an emergency global stop of all of the machines if the error occurs while establishing the wireless communications link;
providing a local shutdown of only the respective machine if the error occurs after a logon of the operating device to the active area;
providing a global ramp-down of all of the machines according to a user-specified schedule if the error occurs while the operating device is logged off; and
providing a local ramp-down of the respective machine according to a user-specified schedule if the operating device leaves the active area for more than a specified duration without logging-off.

2. The method as claimed in claim 1, wherein an operating device function module with status information is provided in the controller for the operating device.

3. The method as claimed in claim 1, wherein an active area function module is provided in the controller to control the alternative steps for each active area.

4. The method as claimed in claim 2, wherein an active area function module is provided in the controller to control the alternative steps for each active area based on the status information.

5. The method as claimed in claim 1, wherein a first status information in the controller specifies whether the operating device is incorporated in or segregated from the controller, wherein "incorporated" means the wireless connection between the operating device and the controller is established, and 'segregated" means the wireless connection is not established.

6. The method as claimed in claim 2, wherein a first status information specifies whether the respective operating device is incorporated in or segregated from the controller, wherein "incorporated" means the wireless connection between the operating device and the controller is established, and 'segregated" means the wireless connection is not established.

7. The method as claimed in claim 3, wherein a first status information specifies whether the respective operating device is incorporated in or segregated from the controller, with the incorporation then being provided when a payload data transmission takes place between the controller and the relevant operating device wherein "incorporated" means the wireless connection between the operating device and the controller is established, and 'segregated" means the wireless connection is not established.

8. The method as claimed in claim 4, wherein a first status information specifies whether the respective operating device is incorporated in or segregated from the controller, with the incorporation then being provided when a payload data transmission takes place between the controller and the relevant operating device wherein "incorporated" means the wireless connection between the operating device and the controller is established, and 'segregated" means the wireless connection is not established.

9. The method as claimed in claim 5, wherein the operating device signals the incorporation of the operating device to a user.

10. The method as claimed in claim 6, wherein the operating device signals the incorporation of the operating device to a user.

11. The method as claimed in claim 5, wherein a second status information specifies whether the relevant operating device is logged-on in an active area.

12. The method as claimed in claim 6, wherein a second status information specifies whether the relevant operating device is logged-on in an active area.

13. The method as claimed in claim 5, wherein an immediate stopping of the assigned machines is triggered when a communication error of an incorporated operating device logged-on in an active area occurs.

14. The method as claimed in claim 6, wherein an immediate stopping of the assigned machines is triggered when a communication error of an incorporated operating device logged-on in an active area occurs.

15. The method as claimed in claim 5, wherein a defined stopping of the assigned machines takes place in an active area-independent fashion when a communication error of an incorporated operating device occurs, in accordance with the specifications of a user.

16. The method as claimed in claim 6, wherein a defined stopping of the assigned machines takes place in an active area-independent fashion when a communication error of an incorporated operating device occurs, in accordance with the specifications of a user.

17. A method for operating a plurality of machines from a wireless mobile operating device, the method comprising:

providing a controller that controls each of the machines;

providing a wireless communication link between the operating device and the controller;

providing an indication on the operating device when the operating device is incorporated with the controller, meaning that the wireless communication link is established;

defining an active area for each respective machine via a transponder on each machine, within which area a user can logon to the active area via the operating device to control the respective machine therein via the controller, wherein the operating device determines when it is within one of the active areas by communicating with and identifying the transponder; and wherein the controller implements the following alternative steps in case of an error on the wireless communication link:

providing an emergency global stop of the plurality of machines if the error occurs while establishing the wireless communications link;

providing a local shutdown of only the respective machine if the error occurs after a logon of the operating device to the active area;

providing a global ramp-down of the plurality of machines according to a user-specified schedule if the error occurs while the operating device is logged off; and providing a local ramp-down of the respective machine according to a user-specified schedule if the operating device leaves the active area for more than a specified duration without logging-off.

* * * * *